UNITED STATES PATENT OFFICE.

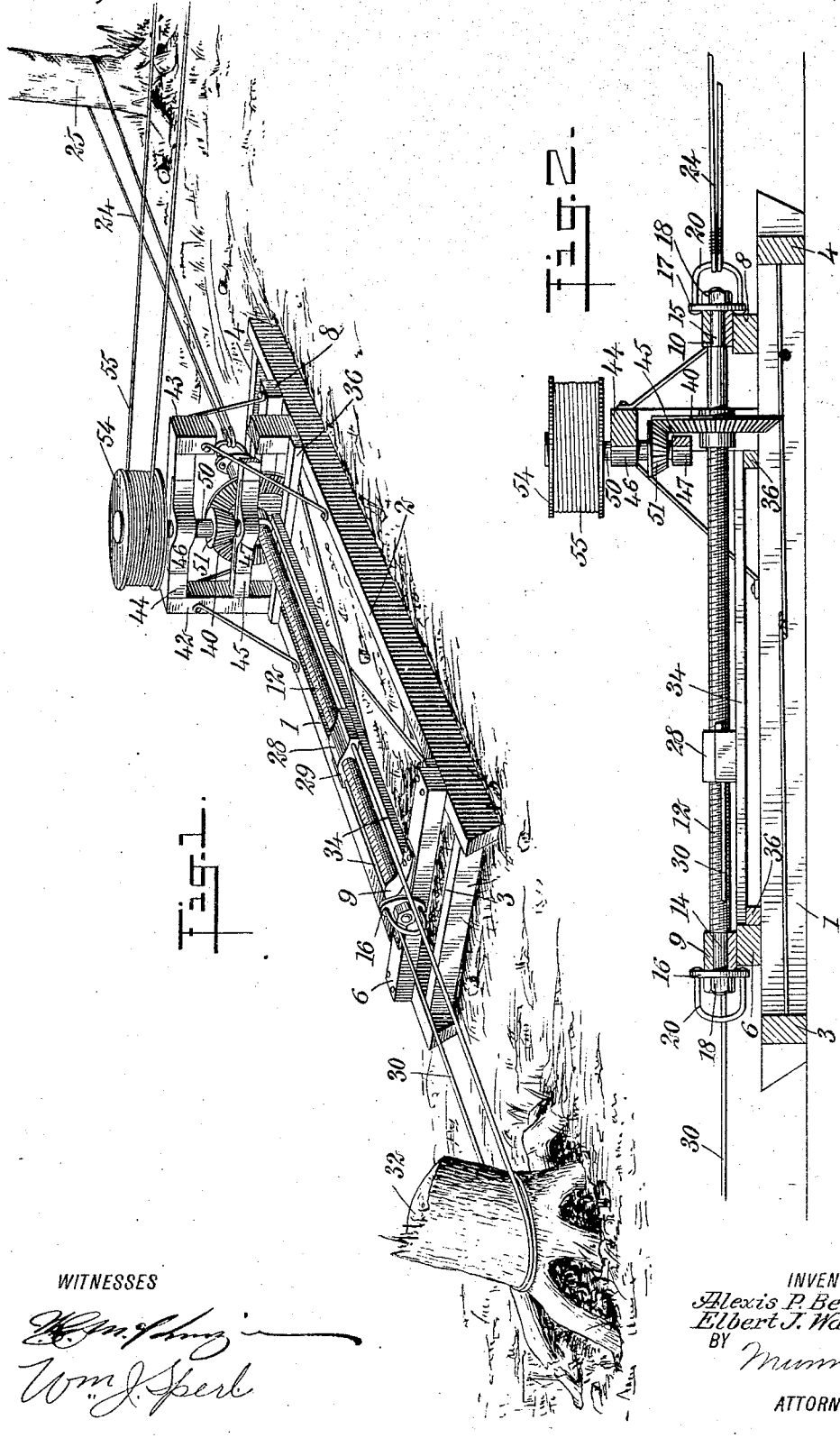

ALEXIS P. BERNIN AND ELBERT J. WARE, OF PORTLAND, OREGON.

STUMP-EXTRACTOR.

944,766.  Specification of Letters Patent.  Patented Dec. 28, 1909.

Application filed January 26, 1909. Serial No. 474,213.

*To all whom it may concern:*

Be it known that we, ALEXIS P. BERNIN and ELBERT J. WARE, both citizens of the United States, and residents of Portland, in the county of Multnomah and State of Oregon, have invented a new and Improved Stump-Extractor, of which the following is a full, clear, and exact description.

This invention relates to machines for extracting stumps or similar obstructions from the ground.

The object of the invention is to provide a machine which is simple in construction, having means whereby the device may be anchored, and improved means for attachment to the stump or other obstruction which is to be removed.

The invention consists in the construction and combination of parts, to be more fully described hereinafter and particularly set forth in the claim.

Reference is to be had to the accompanying drawings forming a part of this specification, in which similar characters of reference indicate corresponding parts in both views, and in which—

Figure 1 is a perspective view showing the machine in position upon the ground, anchored to a tree and also attached to the stump to be extracted; and Fig. 2 is a longitudinal vertical section through the machine.

The supporting frame may be formed of side rails 1 and 2 and end rails 3 and 4, secured to the rails 1 and 2 in any suitable manner. Cross rails 6 and 8 are secured to the upper edges of the side rails 1 and 2 and form supports for bearings 9 and 10 respectively, in which a screw 12 is journaled. Said screw 12 is threaded throughout substantially its entire length, and is formed with reduced ends 14 and 15 respectively, which fit the bearings 9 and 10. Plates 16 and 17 are secured to the ends of the screw 12 by means of nuts 18, and a yoke 20 may be secured to each plate. Said yokes may be formed of bars of iron bent into a U-shape and riveted over against one face of the corresponding plate. The yoke attached to the plate 17 may receive a cable or anchorage member 24, which in the present instance is shown as passing around a tree 25, in order that the frame may be held in proper position.

A nut 28 is arranged to travel longitudinally over the screw 12, and is formed with wings 29, which are apertured to receive a cable or other attaching member 30, which in the present instance is shown as passing around a stump 32 which is to be extracted from the ground. The wings 29 slide over guides 34 extending longitudinally of the frame adjacent the screw 12, and supported at each end upon cross rails 36 and also supported upon the upper edges of the side rails 1 and 2.

A bevel gear 40 is secured to the screw 12, so as to rotate therewith. Extending upwardly from the main frame is an auxiliary frame having side rails 42 and 43 connected by cross rails 44 and 45. Mounted upon the cross rails 44 and 45 are bearings 46 and 47 respectively, in which a shaft 50 is journaled. A bevel pinion 51 is mounted upon the shaft 50, so as to rotate therewith and mesh with the bevel gear 40. A drum 54 is also mounted on the shaft 50 to rotate therewith and may be surrounded by a cable 55 leading to any source of power, whereby the drum 54 may be rotated, in order to rotate the screw 12.

When the screw 12 is rotated in one direction, the nut 28 travels over the guides 34 and tightens the cable or attaching member 30, so as to extract the stump 32 from the ground. When the screw 12 is rotated in the opposite direction, the cable 30 is slackened.

Having thus described our invention, we claim as new and desire to secure by Letters Patent:—

A stump extractor comprising a frame consisting of side bars and connecting cross bars, a bearing on each of said cross bars, a screw having reduced ends journaled in the bearings, and provided near one end thereof with a bevel gear, a vertical shaft journaled on the frame and having a bevel pinion meshing with the gear, a drum on the upper end of the shaft, plates journaled on the ends of the screw outside of the bearing, a yoke connected with each of said plates, nuts for retaining the plates in place, a nut threaded on to the screw intermediate the bearings, and provided upon each side thereof with wings each of said wings having a longitudinal opening, a cable having its ends passed through the opening and adapted to engage the stump, and a guide upon each side of the screw for supporting the wing and upon which the adjacent wing slides.

In testimony whereof we have signed our names to this specification in the presence of two subscribing witnesses.

ALEXIS P. BERNIN.
ELBERT J. WARE.

Witnesses:
E. H. QUACKENBUSH,
A. C. GAGE.